United States Patent
Komarneni et al.

(10) Patent No.: US 6,387,832 B1
(45) Date of Patent: May 14, 2002

(54) HIGH STABILITY TRANSITION METAL NZP TYPE PHOSPHATES

(75) Inventors: Sridhar Komarneni, State College; William W. Gould, Pittsburgh, both of PA (US)

(73) Assignee: The Penn State Research Foundation, University Park, PA (US)

(*) Notice: Subject to any disclaimer, the term of this patent is extended or adjusted under 35 U.S.C. 154(b) by 0 days.

(21) Appl. No.: 09/628,457

(22) Filed: Jul. 31, 2000

Related U.S. Application Data

(60) Provisional application No. 60/177,564, filed on Jan. 21, 2000.

(51) Int. Cl.$^7$ .............................. C03C 1/04; C03C 8/20; C04B 35/48
(52) U.S. Cl. .......................... 501/17; 501/18; 501/21; 501/25; 501/26; 501/32; 501/66; 501/67; 501/102; 501/106; 501/126; 501/134; 423/306
(58) Field of Search .......................... 501/17, 18, 21, 501/25, 26, 32, 66, 134, 102, 106, 126, 67; 423/306

(56) References Cited

U.S. PATENT DOCUMENTS

| | | | |
|---|---|---|---|
| 4,751,206 A | * 6/1988 | Yamai et al. | 501/102 |
| 4,784,976 A | * 11/1988 | Aitken | 501/10 |
| 4,801,566 A | 1/1989 | Limaye | 501/104 |
| 4,925,816 A | * 5/1990 | Watanabe et al. | 501/104 |
| 5,102,836 A | 4/1992 | Brown et al. | 501/104 |
| 5,217,934 A | * 6/1993 | Matsuhiro et al. | 501/106 |
| 5,254,510 A | * 10/1993 | Matsuhiro et al. | 501/104 |
| 5,488,018 A | 1/1996 | Limaye | 501/104 |

OTHER PUBLICATIONS

Matcovic et al., Synthesis and Crystallographic Data of Sodium Thorium Triphosphate, Na2Th2(PO4)3, and Sodium Uranium(IV) Triphosphate, NaU2(PO4)3, Croatica Chemica Acta, 37, pp. 115–116, (1965).*

Sljukic et al., "Preparation and Crystallographci Data of Phosphates with Common Formula MIMIV2(PO4)3 (MI= Li, Na, K, Rb, Cs; MIV=Zr, Hf)," Croatica Chemica Acta, 39, 145–148 (1967).*

Alamo et al, Crystal Chemistry of NZP or CTP, J. Mat. Sci., 21:444 (1986).

Alamo et al, Zirconium Phospho–sulphates with NaZr$_2$(PO$_4$)$_3$—Type Structure, J. Solid State. Chem., 51:270 (1984).

Byrappa et al, Crystallization and Characterization of Na2(La,ME)Zr(PO4)3, J. Materials science, pp. 1419–1426, 1986.

Delmas et al, Crystal Chemistry of the Na$_{1+x}$Zr$_{2-x}$L$_x$(PO$_4$)$_3$ (L =Cr, In, Yb) Solid Solutions, Mat. Res. Bull., 16:285 (1981).

Goodenough et al, Fast Na+ –Ion Transport in Skeleton Structures, Mat. Res. Bull., 11:203 (1976).

Gould et al, Hydrothermal and Solid State Synthesis, Crystal Data and Thermal Stability of Monoclinic and rhombohedral Lithium Zirconium Phosphate, Mat. Res. Bull., vol. 28, pp. 909–914, 1993.

Hong, Crystal Structures and Crystal Chemistry in the system Na$_{1+x}$Zr$_2$Si$_x$P$_{3-x}$O$_{12}$, Mat. Res. Bull., pp. 173–182, 1976.

Ikeda et al, Solid Electrolyts with Multivalent Cation Conduction. 1. Conduction Species in Mg–Zr–PO4 System, Solid State Ionics, pp. 125–129, 1987.

Kaqzakos–Kijowski et al, Synthesis, Crystal Data and thermal Stability of Magnesium Zirconium Phosphate, Mat. Res. Bull., vol. 23, pp. 1177–1184, 1988.

Komarneni, Hydrothermal Preparation of the Low–Expansion NZP Family of Materials, Int. J. High Technology Ceramics, 4:31 (1988).

Komarneni et al, Thermal Expansion of NH$_4$Zr$_2$(PO$_4$)$_3$, J. Materials Science Letters, pp. 1–3, 1986.

Kryukova et al, Preparation and Study of the Crystal Structure of Compounds of the M$^{I_3}$ M$^{III_2}$ (PO$_4$)$_3$ Type, Russian J. Inorg. Chem., 21:14 (1976).

Limaye et al, Syntheis and Thermal Expansion of MZr$_4$P$_6$O$_{24}$ (M=Mg, Ca, Sr, Ba), J. Am. Cer. Soc., 70 [10] C232–236 (1987).

Matkovic et al, Preparative and X–Ray Crystallographic Data on Potassium Dithorium Triphosphate, KTh$_2$(PO$_4$)$_3$, Croat. Chem. Acta, 38:69 (1966).

Petit et al, NMR Study of Li+Motion in the Superionic Conductor LiZr2(PO4)3, solid State Ionics, pp. 293–304, 1986.

Roy et al,[NZP], A New Radiophase for Ceramic Nuclear Waste Forms, Mat. Res. Bull., 17:585 (1982).

Subramanian et al, On the Proton Conductor (H$_3$O)Zr$_2$(PO$_4$)$_3$, Mat. Res. Bull., pp. 1471–1478, 1984.

* cited by examiner

Primary Examiner—David Sample
(74) Attorney, Agent, or Firm—Law Offices of John A. Parrish

(57) ABSTRACT

Transition metal NZP type compounds are synthesized. Examples of these compounds include MnZr$_4$(PO$_4$)$_6$, FeZr$_4$(PO$_4$)$_6$, CoZr$_4$(PO$_4$)$_6$, NiZr$_4$(PO$_4$)$_6$, and CuZr$_4$(PO$_4$)$_6$. These compounds are synthesized by the Xerogel process. These transition metal NZP type compounds can be used as colorants in applications such as ceramic glazes where high thermal stability of the colorant is important.

24 Claims, No Drawings

HIGH STABILITY TRANSITION METAL NZP TYPE PHOSPHATES

This application claims benefit of provisional application Ser. No. 60/177,564 filed Jan. 21, 2000.

TECHNICAL FIELD

The invention relates to high thermal stability zirconium phosphates, having the NZP structure. More particularly, the invention relates to transition metal, zirconium phosphates having high thermal stability.

BACKGROUND ART

The term NZP refers to $NaZr_2(PO_4)_3$, as well as to related isostructural phosphates and silicophosphates having a similar crystal structure. The NZP crystal structure is basically a three-dimensional network of $PO_4$ tetrahedra and $ZrO_6$ octahedra which are linked together by shared oxygens. Each zirconium atom is located on a three-fold axis parallel to the c-axis, and is coordinated to six oxygens. Each phosphorous atom is located on a two-fold axis parallel to the a-axis, and is coordinated to 4 oxygens. Thus each $ZrO_6$ octahedron is connected to six $PO_4$ tetrahedra through the six oxygen atoms making up the corners of the $ZrO_6$ octahedron. Sodium ions are located at the interstitial sites created by the framework, but are replaced with other ions depending on the NZP analog. The NZP structure is exceptionally flexible towards ionic substitution at various lattice sites.

The stoichiometry of NZP compounds can be generalized by the formula $A_{0-4}B_2(XO_4)_3$, wherein A represents a relatively large monovalent or divalent cation, B designates a medium-sized (octahedrally-coordinated) trivalent, tetravalent, or pentavalent cation, and X denotes a small (tetrahedrally-coordinated) tetravalent, pentavalent, or hexavalent cation.

NZP stoichiometry requires the cation ratio B:X to be approximately 2:3. The number of A atoms can range from 0–4, depending upon the net charge of the B and X cations.

A wide variety of NZP type compounds have been prepared. NZP type compounds have been reported for alkali metal and alkaline earth metal cations substituted into the sodium site of the NZP structure. Compounds in which substitutions in the Zr sites, and in the P sites, as well as coupled substitutions involving two or all three of these sites, also have been reported.

Various ceramic compounds have been employed as colorants in ceramic compositions such as glazes. A well known ceramic compound that has been used as a colorant is Zircon. Zircon, however, is expensive. Although Zircon has been widely accepted as a ceramic colorant, a need continues to exist for cost-effective, high thermal stability compounds which can impart desired color characteristics to the ceramic composition during firing.

DISCLOSURE OF THE INVENTION

The invention relates to novel transition metal NZP compounds and diphasic mixtures thereof. These compounds exhibit very high thermal stability and retain their intrinsic color when employed in a ceramic composition.

In a first aspect, inventive compositions have the general formula $M_xZr_4P_6O_{24}$, where M is any of Mn, Fe, Co, Ni, or Cu, and x is about 0.1 to 1.2, preferably about 0.9 to about 1.0.

In another aspect, The inventive compositions have the general formula $(N_{1-x}M_x)Zr_4P_6O_{24}$, where M and N are different and each is any of Mn, Fe, Co, Ni, or Cu, and x is about 0.1 to 1.0, preferably about 0.8 to about 1.0.

The compounds of the invention, due in part to their extremely high thermal stability when for example, employed as additives in ceramic compositions such as glasses and glaze compositions, impart their intrinsic color to the ceramic compositions.

DESCRIPTION OF THE PREFERRED EMBODIMENTS

Materials

The starting materials used to synthesize the NZP compounds of the invention preferably are chemically pure. However, minor amounts of impurities which do not cause a significantly large amount, i.e. greater than about 3.0% by volume, of any second phase to occur in the compound may be tolerated.

Starting materials which may be used to synthesize the NZP compounds include water soluble salts of zirconium such as zirconium oxychloride and zirconium nitrate, preferably zirconium oxychloride; metal chlorides and metal nitrates where the metal cation is a transition metal cation such as Cu, Fe, Ni, Mn, and Co, for substitution into the N site of the NZP compound; and phosphate compounds such as ammonium dihydrogen phosphate, phosphoric acid, and diammonium hydrogen phosphate, preferably phosphoric acid.

Silicon can be partially substituted for phosphorous, and any deficient charge can be compensated by the transition metal in the N site. Useful sources of silicon include $SiCl_4$, $SiO_2$, tetraethoxysilane, and tetramethoxysilane, preferably tetraethoxysilane.

Synthesis

The NZP compounds of the invention are made from precursors of the compounds. The precursors may be made by various known ceramic processing methods such as solid state reaction and Xerogel. Preferably, the precursors are made by the Xerogel method.

Where the Xerogel method is employed to manufacture the precursors for the NZP compounds any of aqueous metal chlorides, metal nitrates, or mixtures thereof, preferably aqueous metal chlorides, more preferably aqueous metal chlorides having a concentration of about 0.1M to about 2.0M, most preferably about 1.0M to about 2.0M, are combined with any of zirconium oxychloride, zirconium nitrate, and zirconium dioxide, preferably zirconium oxychloride solution having a concentration of about 0.2M to about 2.0M, preferably about 1.0M to about 2.0M to form a mixed transition metal cation solution. The resulting solution is treated with dropwise addition of an aqueous phosphate such as ammonium dihydrogen phosphate, phosphoric acid, and diammonium hydrogen phosphate, preferably phosphoric acid solutions having a concentration of about 0.2M to about 6.0M, preferably about 3.0M to about 6.0M, under constant rapid stirring by a magnetic stirrer to precipitate a gel. In a preferred aspect, the metal chloride, zirconium oxychloride and phosphoric acid are used in amounts sufficient to achieve a ratio of N:Zr:P of about (0.8–1.2):2:3, more preferably about 1:2:3. The resulting gels are dried under conditions sufficient to remove volatiles such as water, hydrogen chlorides, and the like. Typically, the gels are dried in air at about 60° C. to about 120° C. for about 4 hours to about 24 hours, preferably about 70° C. for about 24 hours, and then at about 130° C. to about 175° C.

for about 4 hours to about 24 hours, preferably about 150° C, for about 4 hours to produce a powder. The powder is fired at about 800° C. to about 1100° C. for about 4 hours to about 16 hours. The powder may be fired as loose powder, or may be compressed at about 100–200 MPa into pellets prior to firing.

The novel transition metal NZP compounds of the invention have extremely high thermal stability over a wide range of temperatures. These compounds may be used for a variety of applications including, but not limited to, colorants in glazes, colorants in glasses, colorants in polymers, ceramic catalytic convertors, emission control devices, space optics, and the like.

The invention is further illustrated by reference to the following non-limiting examples. Examples 1–23 illustrate synthesis of various transition metal NZP compounds.

Examples 24–26 illustrate the use of these compounds in various ceramic compositions such as glazes to impart color to those compositions.

EXAMPLES 1–4

Cu—Zr—P NZP Type Compounds

Example 1

$CuZr_4(PO_4)_6$ 10 ml of aqueous 1.0 M $CuCl_2$ is dissolved in 80 ml aqueous 0.5M $ZrOCl_2$. The resulting mixture is titrated by dropwise addition of 60 ml of 1.0M $H_3PO_4$ under constant stirring at 20–50 RPM. Addition of the 1.0M $H_3PO_4$ causes immediate formation of a gel. The gel continues to form until all of the $H_3PO_4$ is added.

The gel is dried at 70° C. for 24 hours and then at 150° C. for 4 hours. The resulting dried gel is compressed under 200 MPa into a circular pellet measuring 1 cm in diameter. The pellet is fired in air at 900° C. for 16 hours. During firing, the temperature is increased at the rate of 5° C./min. until the temperature reaches 900° C. The temperature is maintained at 900° C. for 16 hours, and then cooled to room temperature. The resulting $CuZr_4(PO_4)_6$ has a light yellowish green color.

Example 2

10 ml aqueous 0.8 M $CuC_2$ is dissolved in 80 mls aqueous 0.5M $ZrOCl_2$. The resulting mixture is titrated by dropwise addition of 60 mls of 1.0M $H_3PO_4$ under constant stirring at 20–50 RPM. Any gel which forms is dried at 70° C. for 24 hours and then at 150° C. for 4 hours.

The dried gel powder is fired under flowing Ar gas. During firing, the temperature of the furnace is increased at a rate of 5° C./min. until the temperature reaches 900° C. The gel is maintained at 900° C. for 16 hours, and then cooled to room temperature.

Example 3

The procedure of example 2 is repeated except that aqueous 1.1 M $CuCl_2$ is substituted for 0.8 M $CuCl_2$.

Example 4

The procedure of example 2 is repeated except that aqueous 1.2 M $CuCl_2$ is substituted for 0.8 M $CuCl_2$.

EXAMPLES 5–8

Co—Zr—P NZP Type Compounds

Example 5

$CoZr_4(PO_4)_6$ 10 mls of aqueous 1.0 M $CoCl_2$ is dissolved in 80 mls aqueous 0.5M $ZrOCl_2$. The resulting mixture is titrated by dropwise addition of 60 mls of 1.0M $H_3PO_4$ under constant stirring at 20–50 RPM. The 1.0M $H_3PO_4$ causes immediate formation of a gel. The gel continues to form until all of the $H_3PO_4$ is added. The gel is dried at 70° C. for 24 hours and then at 150° C. for 4 hours.

The resulting dried powder is placed into a silica tube. The tube having the powder therein is evacuated, sealed and fired at 900° C. for 16 hours. During firing, the temperature is increased at a rate of 5° C./min. until the temperature reaches 900° C. The temperature is maintained at 900° C. for 16 hours, and then cooled to room temperature.

Example 6

The procedure of example 5 is employed except that 0.8 M $CoCl_2$ is substituted for 1.0 M $CoCl_2$.

Example 7

The procedure of example 5 is employed except that 1.1 M $CoCl_2$ is substituted for 1.0 M $CoCl_2$.

Example 8

10 ml 1.2 M $CoCl_2$ is dissolved in 80 mls aqueous 0.5M $ZrOCl_2$. The resulting mixture is titrated by dropwise addition of 60 mls of 1.0M $H_3PO_4$ under constant stirring at 20–50 RPM The 1.0M $H_3PO_4$ causes immediate formation of a gel. The gel continues to form until all of the $H_3PO_4$ is added. The gel is dried at 70° C. for 24 hours and then at 150° C. for 4 hours.

The resulting dried powder is placed into a silica tube. The tube having the powder therein is evacuated, sealed and fired at 900° C. for 16 hours. During firing, the temperature is increased at a rate of 5° C./min. until the temperature reaches 900° C. The temperature is maintained at 900° C. for 16 hours, and then cooled to room temperature. The resulting $CoZr_4(PO_4)_6$ has a deep violet color.

Example 8A

The procedure of example 8 is followed except that the resulting dried powder is fired in air.

EXAMPLES 9–12

Ni—Zr—P NZP Type Compounds

Example 9

$NiZr_4(PO_4)_6$ 10 mls of aqueous 1.0 M $NiCl_2$ is dissolved in 80 mls aqueous 0.5M $ZrOCl_2$. The resulting mixture is titrated by dropwise addition of 60 mls of 1.0M $H_3PO_4$ under constant stirring at 20–50 RPM. Any gel that forms is dried at 70° C. for 24 hours and then at 150° C. for 4 hours.

The dried gel powder is placed into evacuated and sealed silica tubes, and fired. During firing, the temperature of the furnace is increased at a rate of 5° C./min. until the temperature reaches 16° C. The gel is maintained at 900° C. for 16 hours, and then cooled to room temperature.

Example 10

The procedure of example 9 is employed except that 0.8 M $NiCl_2$ is substituted for 1.0 M $NiCl_2$.

Example 11

The procedure of example 9 is employed except that 1.1 M $NiCl_2$ is substituted for 1.0 M $NiCl_2$.

Example 12

The procedure of example 9 is employed except that 1.2 M $NiCl_2$ is substituted for 1.0 M $NiCl_2$. The resulting $Ni_{1.2}Zr_4(PO_4)_6$ is orange.

Example 12A $NiZr_4(PO_4)_6$

The procedure of example 9 is followed except that the resulting dried powder is fired in air.

EXAMPLES 13–16

Fe—Zr—P NZP Type Compounds

Example 13

$FeZr_4(PO_4)_6$ 10 mls of aqueous 1.0 M $FeCl_2$ is dissolved in 80 mls aqueous 0.5M $ZrOCl_2$. The resulting mixture is titrated by dropwise addition of 60 mls of 1.0M $H_3PO_4$ under constant stirring at 20–50 RPM. The 1.0M $H_3PO_4$ causes immediate formation of a gel. The gel continues to form until all of the $H_3PO_4$ is added. The gel is dried at 70° C. for 24 hours and then at 150° C. for 4 hours.

The dried gel powder is fired under flowing Ar. During firing, the temperature of the furnace is increased at 5° C./min. until the temperature reaches 900° C. The gel is maintained at 900° C. for 16 hours, and then cooled to room temperature. The resulting $FeZr_4(PO_4)_6$ is tan in color.

Example 14

The procedure of example 13 is followed except that 0.8 M $FeCl_2$ is substituted for 1.0 M $FeCl_2$.

Example 15

$[Fe_{1.1}Zr_4(PO_4)_6]$

The procedure of example 13 is followed except that 1.1 M $FeCl_2$ is substituted for 1.0 M $FeCl_2$.

Example 16

The procedure of example 13 is followed except that 1.2 M $FeCl_2$ is substituted for the 1.0 M $FeCl_2$.

Example 16A $FeZr_4(PO_4)_6$

The procedure of example 13 is followed except that the resulting dried powder is fired in nitrogen.

EXAMPLES 17–20

Mn—Zr—P NZP Type Compounds

Example 17

$MnZr_4(PO_4)_6$ 10 mls of aqueous 1.0M $MnCl_2$ is dissolved in 80 mls aqueous 0.5M $ZrOCl_2$. The resulting mixture is titrated by dropwise addition of 60 mls of 1.0M $H_3PO_4$ under constant stirring at 20–50 RPM. Any gel which forms is dried at 70° C. for 24 hours and then at 150° C. for 4 hours.

The dried gel powder is fired under flowing Ar gas. During firing, the temperature of the furnace is increased at a rate of 5° C./min. until the temperature reaches 900° C. The gel is maintained at 900° C. for 16 hours, and then cooled to room temperature.

Example 18

The procedure of example 17 is followed except that 0.8 M $MnCl_2$ is substituted for 1.0 M $MnCl_2$.

Example 19

The procedure of example 17 is followed except that 1.1 M $MnCl_2$ is substituted for 1.0 M $MnCl_2$.

Example 20

$Mn_{1.2}Zr_4(PO_4)_6$

The procedure of example 17 is followed except that 1.1 M $MnCl_2$ is substituted for 1.0 M $MnCl_2$. The resulting $Mn_{1.2}Zr_4(PO_4)_6$ is faintly pink-white colored without extraneous X-ray diffraction lines as measured on a SCINTAG PAD-V diffractometer using Cu K-alpha radiation.

Example 20A $MnZr_4(PO_4)_6$

The procedure of example 17 is repeated except that the powder is fired in nitrogen.

EXAMPLES 21–23

Mixed Transition Metal-Zr—P NZP Type Compounds

Example 21

$Co_{0.5}Ni_{0.5}Zr_4(PO_4)_6$ 5 mls of aqueous 1.0M $CoCl_2$ and 5 mls of aqueous 1.0M $NiCl_2$ are blended to form a mixed metal cation solution. This solution is dissolved in 80 mls aqueous 0.5M $ZrOCl_2$. The resulting mixture is titrated by dropwise addition of 60 mls of 1.0M $H_3PO_4$ under constant stirring at 20–50 RPM. The gel which forms is dried at 70° C. for 24 hours and then at 150° C. for 4 hours.

The dried gel powder is fired under flowing Ar gas. During firing, the temperature of the furnace is increased at a rate of 5° C./min. until the temperature reaches 900° C. The gel is maintained at 900° C. for 16 hours, and then cooled to room temperature.

Example 22

$Cu_{0.5}Ni_{0.5}Zr_4(PO_4)_6$

The procedure of example 21 is employed except that 1.0M $CuCl_2$ is substituted for the 1.0M $CoCl_2$.

Example 23

The procedure of example 21 is employed except that 0.66M $CrCl_3$ is substituted for the 1.0M $NiCl_2$.

Example 23A

The procedure of example 23 is followed except that the loose powder is fired in air.

In another aspect of the invention, the transition metal NZP type compounds corresponding to any of $M_xZr_4P_6O_{24}$, where M is any of Mn, Fe, Co, Ni, or Cu, and x is about 0.1 to about 1.2, or $(N_{1-x} M_x)Zr_4P_6O_{24}$ where M and N are different and each is any of Mn, Fe, Co, Ni, or Cu, and x is about 0.1 to 1.0 are employed to produce modified ceramic compositions such as modified ceramic glaze compositions, modified glass compositions and filled organic polymeric compositions to impart color.

Examples of modified ceramic glaze compositions include a ceramic glaze in an amount of about 80% to about 95%, preferably about 90%, optional opacifier in an amount of up to about 14%, preferably about 6%, and a transition metal NZP compound of the invention in an amount of about 2% to about 8%, preferably about 4% all amounts based on the total weight of the modified glaze composition.

Examples of modified glass compositions include a glass in an amount of about 90% to about 98%, preferably about 95%, and a transition metal NZP of the invention in an amount of about 2% to about 98%, preferably about 5%, all amounts based on the total weight of the modified glass.

Examples of organic polymers include homopolymers and copolymers of such as polyethylene and polypropylene. The polymer may be present in an amount of about 95–98%, preferably 97%, and the transition metal compound may be present in an amount of about 5–2%, preferably about 3%, all amounts based on the combined weight of polymer and transition metal compounds.

This aspect of the invention is illustrated below by the following nonlimiting examples.

Example 24

Modified Ceramic Glaze Composition

A modified ceramic glaze is prepared by mixing a ceramic glaze composition with an opacifier and a transition metal NZP compound of the invention. The ceramic glaze composition includes 0–5% $Li_2O$, 0–5% $Na_2O$, less than 2% by weight $K_2O$, 0–3% MgO, 0–4% CaO, 0–4% SrO, 0–4% BaO, 0–4% ZnO, 15–27% $B_2O_3$, 10–20% $Al_2O_3$, 43–58% $SiO_2$, 0–3% $TiO_2$, 0–4% $ZrO_2$, 0–2% $Sb_2O_3$, and 0–3% F, the opacifier is Zirconium Silicate, and the transition metal NZP compound is $Mn_{1.2}Zr_4(PO_4)_6$. All amounts are in percent by weight based on the total combined weight of glaze, Zirconium Silicate, and $Mn_{1.2}Zr_4(PO_4)_6$:

| Component | Amount (%) |
|---|---|
| Glaze | 90 |
| Zirconium Silicate | 6 |
| $Mn_{1.2}Zr_4(PO_4)_6$ | 4 |
| Total: | 100 |

Example 25

Filled Polymer

A filled polymer is prepared by mixing a polymer and a transition metal NZP compound of the invention. The polymer is polyethylene and the transition metal NZP compound is $Mn_{1.2}Zr_4(PO_4)_6$. All amounts are in percent by weight based on the total combined weight of polymer and $Mn_{1.2}Zr_4(PO_4)_6$:

| Component | Amount (%) |
|---|---|
| Polyethylene | 95 |
| $Mn_{1.2}Zr_4(PO_4)_6$ | 5 |
| Total: | 100 |

Example 26

Modified Glass Composition

A modified glass composition is prepared by mixing a silicate glass composition and a transition metal NZP compound of the invention. The silicate glass composition is PbO—ZnO—$B_2O_3$, and the transition metal NZP compound is $Mn_{1.2}Zr_4(PO_4)_6$. All amounts are in percent by weight based on the total combined weight of the glass and $Mn_{1.2}Zr_4(PO_4)_6$:

| Component | Amount (%) |
|---|---|
| Silicate Glass | 90 |
| $Mn_{1.2}Zr_4(PO_4)_6$ | 5 |
| Total: | 100 |

What is claimed is:

1. A thermally stable, transition metal NZP type compound having an intrinsic color, the compound capable of imparting the intrinsic color to a ceramic composition comprising the compound, the compound having a formula $M_xZr_4P_6O_{24}$, where M is any of Mn, Fe, Co, or Cu, and x is about 0.1 to about 1.2.

2. The compound of claim 1, wherein x is about 0.8 to about 1.2.

3. The compound of claim 1, wherein M is Cu and x is about 1.0.

4. The compound of claim 1, wherein M is Ni and x is about 1.2.

5. The compound of claim 1, wherein M is Fe and x is 1.0.

6. The compound of claim 1, wherein M is Mn and x is about 1.2.

7. A thermally stable, transition metal NZP type compound having an intrinsic color, the compound capable of imparting the intrinsic color to a ceramic composition comprising the compound, the compound having a formula $(N_{1-x} M_x)Zr_4P_6O_{24}$, where M and N are different and each is any of Mn, Fe, Co, or Cu, and x is about 0.1 to 1.0.

8. The compound of claim 7 wherein x is about 0.8 to 1.0.

9. The compound of claim 7 wherein N is Co, M is Ni and x is 0.5.

10. The compound of claim 1 wherein P is partially substituted by Si.

11. The compound of claim 7 wherein P is partially substituted by Si.

12. A modified glaze composition comprising a ceramic glaze composition and a transition metal NZP compound corresponding to any of $M_xZr_4P_6O_{24}$, where M is any of Mn, Fe, Co, Ni, or Cu, and x is about 0.1 to about 1.2, or ($N_{1-x}M_x$)$Zr_4P_6O_{24}$ where M and N are different and each is any of Mn, Fe, Co, Ni, or Cu, and x is about 0.1 to 1.0.

13. The modified glaze composition of claim 12 wherein the modified ceramic glaze composition includes a ceramic glaze in an amount of about 80% to about 95%, and the transition metal NZP compound in an amount of about 2% to about 8%, all amounts based on the total weight of the modified glaze composition.

14. The modified glaze composition of claim 13 wherein the ceramic glaze is present in an amount of about 90%.

15. The modified glaze composition of claim 14 wherein the opacifier is present in an amount of up to about 14%.

16. The modified glaze composition of claim 13 wherein the opacifier is present in an amount of up to about 6%.

17. The modified glaze composition of claim 16 wherein the transition metal NZP compound is present in an amount of about 4%.

18. The modified glaze composition of claim 12 wherein the glaze composition comprises 0–5% $Li_2O$, 0–5% $Na_2O$, less than 2% by weight $K_2O$, 0–3% MgO, 0–4% CaO, 0–4% SrO, 0–4% BaO, 0–4% ZnO, 15–27% $B_2O_3$, 10–20% $Al_2O_3$, 43–58% $SiO_2$, 0–3% $TiO_2$, 0–4% $ZrO_2$, 0–2% $Sb_2O_3$, and 0–3% F, the opacifier is Zirconium Silicate, and the transition metal NZP compound is $Mn_{1.2}Zr_4(PO_4)_6$.

19. A method of manufacture of a transition metal NZP compound corresponding to any of $M_xZr_4P_6O_{24}$, where M is any of Mn, Fe, Co, or Cu, and x is about 0.1 to about 1.2, or ($N_{1-x}M_x$)$Zr_4P_6O_{24}$ where M and N are different and each is any of Mn, Fe, Co, or Cu, and x is about 0.1 to 1.0 comprising, mixing a transition metal cation solution selected from the group consisting of aqueous metal chlorides, metal nitrates, or mixtures thereof with a zirconium cation solution selected from the group consisting of zirconium oxychloride, zirconium nitrate, and zirconium dioxide, to form a mixed transition metal cation solution, reacting the mixed transition metal cation solution with an aqueous phosphate selected from the group consisting of ammonium dihydrogen phosphate, phosphoric acid, and diammonium hydrogen phosphate to precipitate a gel, drying the gel to produce a powder, and firing the powder to produce a transition metal NZP compound corresponding to the formula $M_xZr_4P_6O_{24}$.

20. The method of claim 19 wherein the transition metal cation solution is an aqueous transition metal chloride.

21. The method of claim 20 wherein the zirconium cation solution is zirconium oxychloride.

22. The method of claim 21 wherein the aqueous phosphate is phosphoric acid.

23. The method of claim 19 wherein the aqueous phosphate is phosphoric acid having a concentration of about 0.2M to about 6.0M.

24. The method of claim 19 wherein the aqueous phosphate is phosphoric acid having a concentration of about 3.0M to about 6.0M.

* * * * *